Figure 1:
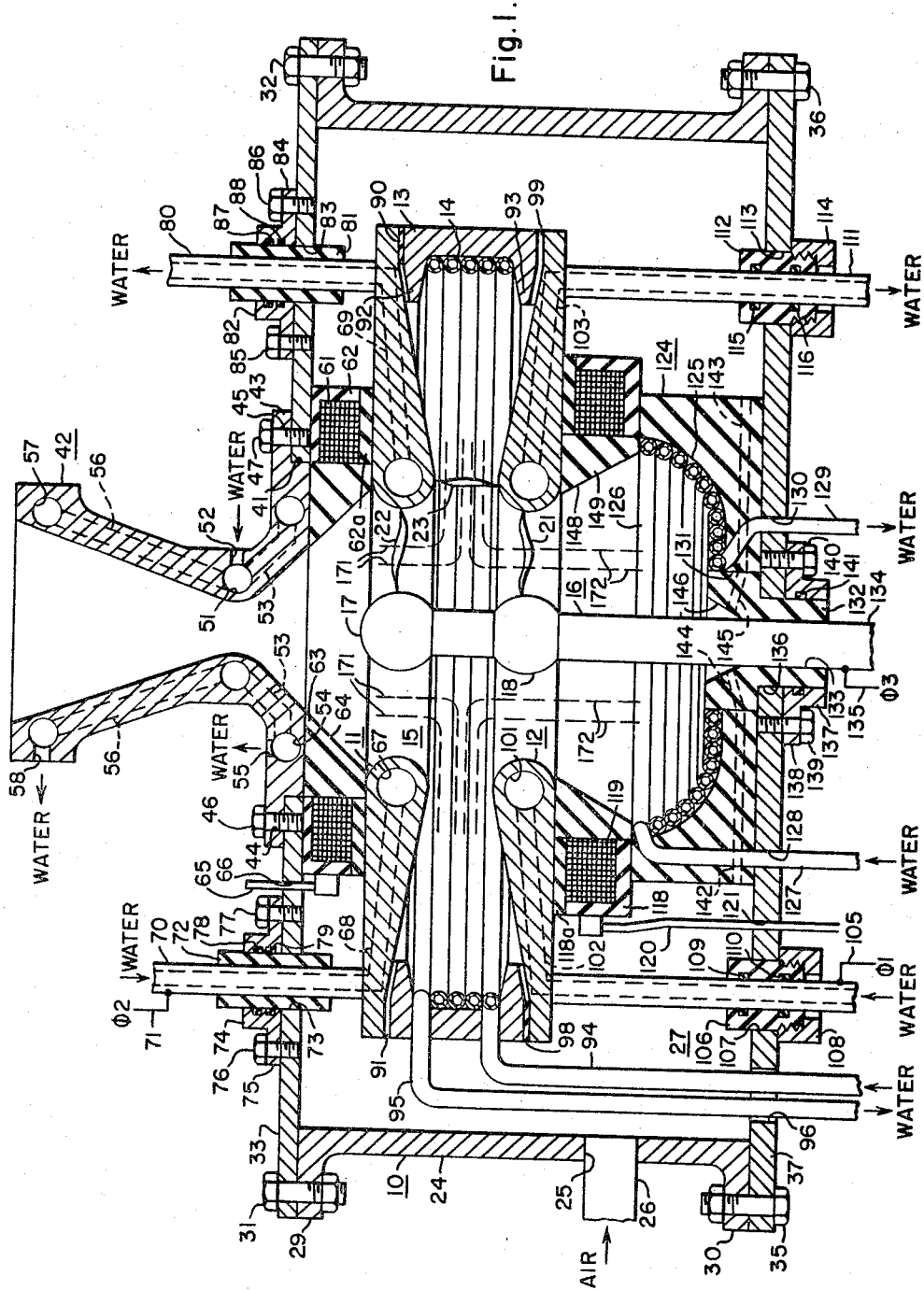

United States Patent Office 3,316,444
Patented Apr. 25, 1967

3,316,444
ARC HEATER FOR USE WITH THREE-PHASE ALTERNATING CURRENT SOURCE AND CHAMBER AND ELECTRODE STRUCTURE FOR USE THEREIN
Raymond M. Mentz, Monroeville, Pa., assignor to Westinghouse Electric Corporation, Pittsburgh, Pa., a corporation of Pennsylvania
Filed June 11, 1964, Ser. No. 374,401
18 Claims. (Cl. 315—111)

This invention relates to arc heaters, and more particularly to gas arc heaters suitable for use with a three-phase alternating current power source.

As will be readily understood by those skilled in the art, economy of construction of an arc heater, power availability, and efficiency in the conversion of electrical energy to heat energy to increase the enthalpy of the gas are important considerations. For this reason an arc heater utilizing three-phase alternating current offers improved performance.

My invention affords this improved performance and includes, but is not limited to, two spaced disk-shaped toroidal electrodes, and one bi-spherical, rod-type electrode disposed with the two spheres in substantial coplanar alignment with the toroidal electrode surfaces, or in substantial coplanar alignment with the arc surface areas of the toroidal electrodes. Each of the two toroidal electrodes and the rod-type electrode carry one phase of a three-phase alternating current source connected thereto, and all of the electrodes are water-cooled. Arcs are generated and maintained across three substantially equally spaced gaps, with rotational forces on all three of the arcs supplied by two magnetic field producing coils disposed in predetermined positions with respect to the electrodes. Furthermore, the flow of gas to be heated into the arc chamber is divided into a number of paths, and supplied to the arc areas through axially located gas inlet ports and circumferentially located gas inlet ports, so that gas coming into the chamber through any port passes through two of the arcs. A water cooled radiation heat shield is provided between the toroidal electrodes, and most of the surface of the chamber which is exposed to radiation is water cooled. Surfaces which are not directly water cooled are of electrical and thermal insulating materials which are tapered and positioned in a manner to minimize the amount of radiation received.

Accordingly, a primary object of my invention is to provide a new and improved arc heater offering advantages over any single-phase and three-phase arc heater now existing in the art.

Another object is to provide a new and improved three-phase arc heater in which all gas entering the arc chamber passes through at least two of the arcs.

A further object is to provide a three-phase arc chamber in which three equally spaced gaps or arc paths for the three phases are provided.

Still a further object is to provide a three-phase arc chamber in which mixing of the gases is improved to provide a more even temperature distribution to the gas.

Figure 2:
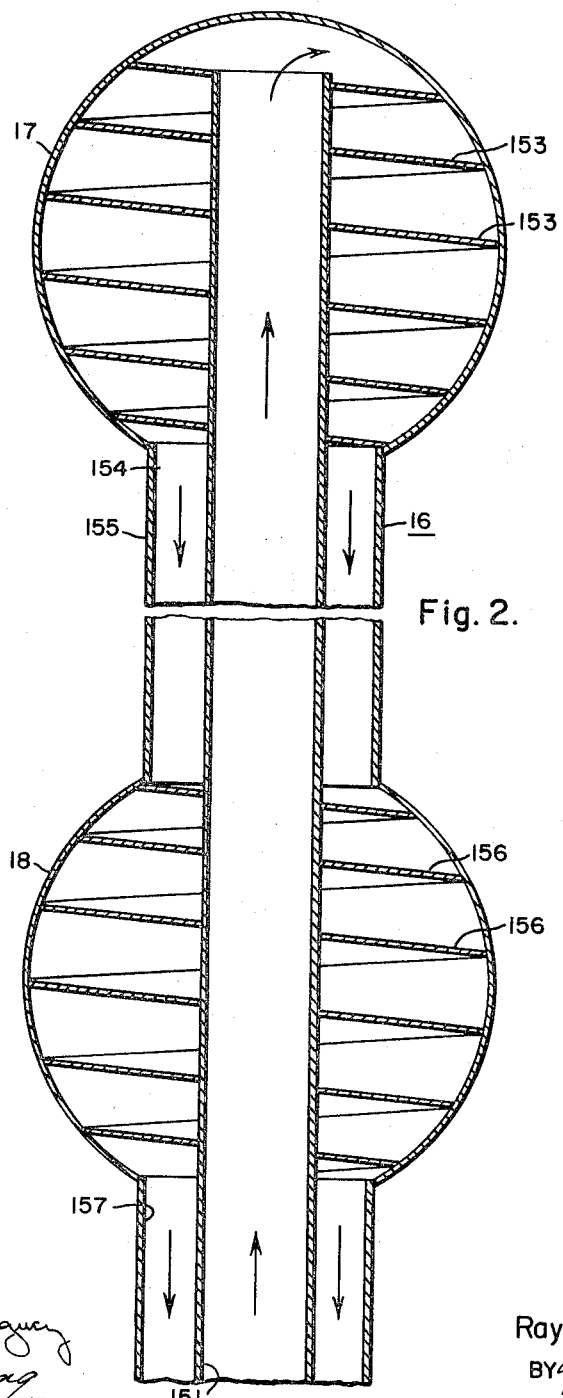

These and other objects will become more clearly apparent after a study of the following specification, when read in connection with the accompanying drawings, in which:

FIGURE 1 is a cross-sectional view through an arc heater embodying my invention; and FIG. 2 is a cross-sectional view through the bi-spherical, rod-type electrode of my invention.

Referring now to the drawings, in which like reference numerals are used throughout to designate like parts, for a more detailed understanding of the invention and in particular to FIG. 1 thereof, a pressure shell, or pressure vessel, generally designated 10, has toroidal electrodes generally designated 11 and 12 disposed therein and electrically insulated from each other and from the pressure vessel, the electrodes 11 and 12 having disposed therebetween a heat shield 13 with a cooling coil 14 on the interior surface thereof. Axially disposed in the arc area or arc chamber 15 is a bi-spherical, rod-type electrode 16 having spherical portions 17 and 18. The three electrodes 11, 16 and 12 are connected to the three conductors of a three-phase alternating current source by means hereinafter to be described to produce arcs 21, 22 and 23 having the paths shown.

The pressure vessel generally designated 10 is seen to have a cylindrical wall portion 24 with an aperture 25 therein in which is disposed a pipe or conduit 26 for admitting air or other gas to be heated to the interior 27 of the pressure vessel. The cylindrical wall portion 24 has annular flanges 29 and 30 at the ends thereof, the flange 29 having a plurality of bores at spaced intervals around the periphery thereof in which are disposed bolts, two of these being shown at 31 and 32, for securing the cylindrical body portion 24 to an end cover plate 33 composed of metal or other suitable material. The bolts pass through aligned bores in the cover plate 33, as shown. The aforementioned flange 30 also has a plurality of bores at spaced intervals around the periphery thereof in which are disopsed bolts, including bolts 35 and 36, for securing an end cover plate 37 thereto.

For convenience of illustration, the apparatus in FIG. 1 is shown with the exhaust nozzle pointing upward, but it should be understood that the nozzle may point to the side or downward, as desired. Other exhaust configurations could be applied to suit specific applications. The top cover plate 33 as seen in FIG. 1 has a number of bores or apertures therein including a large and preferably centrally disposed circular aperture 41 in which is mounted the nozzle generally designated 42, the nozzle having an annular flange 43 at the mounting end thereof, having a plurality of spaced bores around the periphery thereof, two of these bores being shown at 44 and 45, in which are disposed bolts 46 and 47 for securing the nozzle 42 to the cover plate 33, the bolts 46 and 47 having their threaded ends in threaded engagement with aligned threaded bores in the cover plate. Preferably the interior or end surface of the nozzle when mounted in the cover plate is coplanar with the interior surface of the cover plate, as shown. The nozzle 42 has an annular circular passageway 51 therein constituting a water header, and communicating with an inlet water conduit 52. From the inlet water header 51 a plurality of spaced passageways 53 extends downward through the body of the nozzle to an outlet water header 54, having an exit conduit 55; extending upwardly along the throat portion of the nozzle from the inlet water header 51 are an additional plurality of passageways 56, terminating in an outlet water header 57 with outlet conduit 58.

Inside the chamber 27 formed by cylindrical wall or casing 24 and end plates 33 and 37, and adjacent the aforementioned cover plate 33 is a field coil 61 disposed in an insulating housing 62, the coil and housing spacing the aforementioned electrode 11 from the end plate 33 and also insulating the electrode from the end plate. If desired, the portion of the coil housing adjacent the electrode, designated 62a, may be composed of a highly heat resistant material as well as an electrically insulating material. Disposed around the inside surface of the annular coil housing 62 is an annular ring 63 composed of insulating and heat resistant material, having one surface snugly fitting against the interior surface of the nozzle, and having one surface snugly and smoothly abutting against the electrode 11, with a tapering inside wall 64 facing the interior of the arc chamber, so that the inside wall 64 constitutes in effect a smooth continuation of the inner surface of the nozzle, and it is seen that the inner end of the annular ring 63 has the thickness of the ring reduced so that a small portion of the electrode 11 extends inwardly beyond the inner adjacent edge of the ring 63. The ring member 63 may be composed of a high temperature ceramic, such as beryllium-oxide, although other high temperature ceramics may be used.

The conduit 65 connected to the coil housing 62 extends through a bore 66 in the end cover plate 33, the conduit 65 containing leads, not shown, connected to the coil 61 for bringing a D.C. energizing potential thereto.

The aforementioned toroidal electrode generally designated 11 is seen to have a large annular passageway 67 therein for the flow of a cooling fluid such as water, passageway 67 having connected thereto an inlet conduit 68 and an outlet conduit 69. Preferably these inlet and outlet conduits are disposed 180° apart so that water entering at 68 will follow two semi-circular paths around the electrode. The inlet conduit 68 connects with, and may be secured to, by any convenient means not shown, an inlet water pipe 70 which is composed of conductive material and constitutes means for bringing current to the electrode 11. Pipe 70 has lead 71 connected thereto, which may be connected to, for example, phase two of the three-phase source. It will be understood that the pipe 70 is connected by way of hydraulic insulation means, not shown, to a source of cooling fluid under pressure. The pipe 70 is seen to have a sleeve or bushing 72 of insulating material disposed therearound, the sleeve being mounted in a bore 73 end cover plate 33, the sleeve being held in position by an annular retaining member 74 having a flange 75 with spaced bores around the periphery thereof, in which are located bolts, two of these being shown at 76 and 77, in threaded engagement with aligned threaded bores in the plate 33, to hold the retaining member firmly to the plate. The retaining member 74 is seen to have a pair of annular grooves on the inner surface of the bore therethrough, in which are disposed a pair of O-rings 78 and 79 are providing close sealing engagement.

Oppositely disposed from the inlet pipe 70 is an outlet pipe 80 communicating with the fluid outlet conduit 69 in electrode 11, pipe 80 being secured by any convenient means, not shown, to the electrode generally designated 11. The pipe 80 passes through a sleeve or bushing 81 composed of insulating material, which is mounted in a bore 83 in the cover plate 33, and held in position therein by retaining member 82 having a flange 84 with spaced bores around the periphery thereof in which are located bolts having their threaded ends in threaded engagement with aligned threaded bores in the end plate 33, two of these bolts being shown at 85 and 86. The retaining member 82 has a pair of annular grooves therein in which are disposed O-rings 87 and 88 for providing a close sealing engagement between the sleeve and the retaining member.

Pipes 70 and 80 are electrically isolated by hydraulic insulators, not shown, from the remainder of the apparatus or circuit of the water or other coolant.

Disposed between the toroidal electrode 11 and the aforementioned toroidal electrode 12 is the aforementioned heat shield 13. The heat shield 13 is spaced from the adjacent inner surface of electrode 11 by a plurality of arcuate spacer members 90 composed of insulating material disposed around the periphery of the electrode and around the periphery of the heat shield, with a large number of spaces between adjacent ends of the arcuate insulating members 90 to provide air inlet spaces as shown, one of the air inlet spaces being designated 91. It is seen that the arcuate spacers 90 composed of insulating material are completely optically baffled, with respect to direct radiation from the arcs and incandescent gases in the chamber 15, by the inwardly-extending annular flange portion 92 of the heat shield 13.

At the other end of the heat shield 13 there is an additional inwardly-extending flange portion 93, and disposed against the inner wall of the main portion of the heat shield is the aforementioned cooling coil 14 which has an inlet conduit portion 94 and an outlet conduit portion 95, both of which pass through an aperture 96 in the aforementioned end cover plate 37. The conduit portions 94 and 95 are spaced from and insulated from the adjacent wall of the end plate 37. Suitable retaining means, not shown for convenience of illustration, may be located adjacent the aperture 96 and held to the cover plate 37 as by bolts, not shown, and may include means for providing a close sealing engagement with the conduits 94 and 95 to effectively seal the inner chamber 27 of the pressure vessel 10.

The electrical potential of the heat shield 13 is floating with respect to the potential of the electrodes, to discourage the formation of an arc path between the electrodes and the heat shield. Conducits 94 and 95 may be insulated, as by hydraulic insulators, from the source of water supply, or the supply of other cooling fluid.

A plurality of arcuate shaped spacer members disposed around the lower periphery of the heat shield 13 space the heat shield 13 from the adjacent surface of electrode 12, one of these arcuate shaped insulating members being shown at 98, one of the air inlet spaces between the arcuate spacer members being shown at 99, for admitting additional air or other gas to be heated into the arc chamber 15. The arcuate shaped insulating members 98 are completely optically baffled from radiation from the arc, and radiation from the hot gases in the arc chamber 15, by the inwardly extending annular flange portion 93 of the heat shield 13.

Air entering the arc chamber 15 by way of inlets 91 and 99 passes through two of the arc paths before being exhausted through the nozzle.

Any convenient means, not shown for convenience of illustration, may be provided if needed for applying clamping forces to firmly secure the electrodes, arcuate insulating members, and heat shield in place in a manner to withstand the pressures generated in the arc chamber 15.

Toroidal electrode 12 has a large annular passageway 101 therein with an inlet conduit 102 and an outlet conduit 103 connected thereto; preferably conduits 102 and 103 are disposed 180° apart so that cooling fluid follows two semi-circular paths in the annular passageway 101. The inlet conduit 102 communicates with a water inlet pipe 104 composed of conductive material which may be secured by any convenient means, not shown, to the electrode, the pipe 104 forming means for bringing current to the electrode and having lead 105 connected thereto, which may be connected to, for example, phase one of the three-phase power supply. Pipe 104 passes through structure similar to elements 72–79, inclusive, and including an insulating bushing or sleeve 106, the sleeve being disposed in a bore 107 in the end plate 37, the outer end of the sleeve 106 being threaded as shown and in threaded engagement with a retaining collar 108. The sleeve 106 has two annular grooves therein in which are located O-rings 109 and 110 to provide close sealing engagement with pipe 104. It is noted that the pipe 104 is electrically insulated from the end cover plate 37.

The aforementioned outlet conduit 103, which communicates with the annular passageway 101, is connected to an outlet pipe 111 passing through a retaining sleeve bore bushing 112 composed of insulating material and located in a bore 113 in the cover plate 37, the sleeve 112 having a threaded outer end in threaded engagement with a retaining collar 114, the sleeve 112 having two annular grooves in which are disposed O-rings 115 and 116 for providing close sealing engagement. It will be understood that the pipe 111 is connected by a suitable hydraulic insulator, which may be of any convenient form, to other outlet conduit means, and pipe 104 is electrically isolated by hydraulic insulator means, not shown. Pipe 111 could, if desired, pass through a structure similar to members 81–88 inclusive.

Disposed adjacent the lower surface of the aforementioned electrode 12 is a housing 118 for an additional field coil 119, the housing 118 being composed of insulating material, and there is shown a conduit 120 passing through an aperture 121 in the cover plate 37, the conduit containing leads, not shown, for bringing an energizing D.C. potential to the field coil 119. The portion of the field coil housing adjacent electrode 12, and designated 118a, may have special heat insulating properties as well as being electrically insulating.

Annular coil housing 118 has a ring 149 composed of highly heat resistant material and electrically insulating material disposed adjacent the inside surfaces thereof, ring 149 having a tapering inner surface 148 to reduce the amount of radiation received thereby.

The housing 118 is supported in position adjacent the electrode by a large annular bowl-shaped supporting member composed of insulating material and generally designated 124. The inner bowl surface 125 of the member 124 is protected from direct radiation from the arc and the hot gases in the chamber 15 by a cooling coil 126 having an inlet conduit portion 127 passing through a bore 128 in the cover plate 37, the coil 126 also having an outlet conduit portion 129 passing through a bore 130 in the cover plate 37. The support member 124 is seen to have a large, centrally disposed aperture 131 in which is mounted the sleeve-like member or bushing 132 composed of insulating material, and having a central bore 133 through which passes in snug engagement therein the stem portion or shank portion 134 of the aforementioned rod electrode generally designated 16, the electrode 16 having lead 135 connected thereto, lead 135 being connected to, for example, phase three of the alternating current source. Sleeve 132 passes through a bore 136 in cover plate 37, and is retained in position therein by collar member 137 having a flange 138 with a plurality of bores at spaced intervals around the periphery thereof, in which are disposed bolts, two of these being shown at 139 and 140, for retaining the collar 137 on the cover plate. The collar 137 has an annular groove therearound in which is disposed the O-ring 141.

A plurality of radially-extending passageways are provided in the support member 124, two of these passageways being shown at 142 and 143, these passageways communicating with aligned passageways including passageways 144 and 145 in the sleeve 132. It is seen that the inner end of the axial bore 133 in collar 132 flares outwardly at 146, and that the passageways including 144 and 145 terminate in this flaring wall portion 146 so that air or other gas may enter the arc chamber 15 from the interior 27 of the pressure vessel 10 by way of conduits 142 and 144, and also by way of conduits 143 and 145. Air entering through these conduits passes through the opening or space provided by the tapered wall 146 and passes through both of the arcs 21 and 22 before being exhausted from the nozzle 42.

Particular reference is made now to FIG. 2, where an enlarged view of the bi-spherical rod electrode generally designated 16 is shown. It is seen that a conduit portion 151 extends up the center of the electrode, and that water or other coolant flows into this conduit 151 to the end thereof which terminates in sphere 17 short of the wall thereof, water exiting from this conduit 151 flowing in a spiral passage provided by the spiraling flange or flanges 153, water after flowing the entire length of the sphere 17 passing through an annular passageway 154 provided between the conduit 151 and the outer wall 155 of the electrode. The sphere 18 has a plurality of spiraling flanges 156; water from annular passageway 154, after traveling the spiral path provided by spiral flange or flanges 156, flows into the annular passageway 157 and thence out to suitable water outlet means, not shown. It is understood that both the conduit 151 and the outer wall portion 155 of the electrode are insulated, as by hydraulic insulators, to provide electrical insulation for this electrode 16 which is connected to one terminal of the power supply.

There has been provided, then, apparatus well suited to accomplish the aforedescribed objects of the invention. The three moving arcs provide an efficient use of electrical power. Fields set up by the magnetic field producing coils 61 and 119 cause the arcs to rotate substantially continuously to prevent the formation of hot spots on the electrodes. It is noted that the field coils 61 and 119 are quite close to the arcs so that a strong field may be set up in the arc zone without too much expenditure of electrical power. Air to be heated coming in the openings 91 and 99 must pass through both the arc path 23 and the arc path 22 before being exhausted from the nozzle, whereas air coming in passageways 144 and 145 must pass through both arc paths 21 and 22 before being exhausted by the nozzle.

As aforementioned, the sloping surface 148 of ring 149 provides that this ring member does not receive excessive radiation from the arc and the hot gases. Ring 149 may also be composed of a highly heat resistant ceramic such as beryllium-oxide. The nozzle, electrodes and heat shield are water cooled. All insulating material except the rings 149 and 63 are completely optically baffled from radiation from the arms and the hot gases. Furthermore, gases entering passageways 91 and 99 on the one hand, and 144 and 145 on the other hand, enter at right angles to each other, which insures a good mixing of the gases and substantially uniform temperature for the heated gas. The arc chamber may be constructed as a unit and mounted on rollers, not shown, for conveniently removing the chamber from the pressure vessel. In addition to making a more efficient use of electrical power, the apparatus of my invention provides a more simplified electrode arrangement; it provides a compact arrangement resulting in lower thermal losses to water cooled heat shields, electrodes, ceramics and so forth; dual entry of the gas at two ports allows all of the gas to pass through two arcs, resulting in extremely high gas enthalpies and temperatures with corresponding high efficiencies; and gases flowing through the arcs meet at right angles, resulting in good mixing of the gases, which gives a more even temperature distribution to the gas.

The term "insulating" when employed herein without a modifier means electrically insulating.

If desired, the heat shield 13 may be supported in position by studs or arms extending from the inner wall of casing 24, or heat shield 13 may have a flange secured to the casing wall, so long as the heat shield is maintained electrically neutral with respect to, or electrically isolated from, all three electrodes, to discourage any arc striking to the heat shield. If conduits 94 and 95 are sufficiently rigid, the entire shield may be supported by them, and maintained electrically neutral. Some or all of the arcuate spacers 90 and 98 composed of electrically insulating material may be dispensed with, where possible.

The rings 63 and 149 shown as solid may, if desired, be hollow, and composed partially of metal with an electrically insulating surface or portion to maintain electrical insulation between the electrode 11 and the nozzle on the one hand, and between the electrode 12 and the cooling coils 126 on the other hand, surfaces exposed to direct radiation being composed of highly heat resistive material.

It will be understood that electrode portion 17 may be spaced from electrode 11 by a distance which is equal to the spacing between electrode 11 and electrode 12, and electrode portion 18 spaced from electrode 12 a similar distance to provide substantially equal loads on all phases of the three-phase alternating current source.

Before energizing potentials are applied to the three electrodes, field coils 61 and 119 are energized by direct current, the coils being so wound or the polarities of the sources of energizing potential being so chosen that their fields oppose each other. The result is a magnetic field or fields perpendicular to all three of the arc paths as represented or indicated by lines 171 and 172. Field 171 causes arc 22 to rotate about spherical portion 17; field 172 causes arc 21 to rotate about spherical portion 18; and both fields 171 and 172 cause arc 23 to follow a circular path, continuously moving around the peripheries of electrodes 11 and 12.

To start the arc heater, before energizing potentials are applied, ignition fuse wires, not shown for convenience of illustration, are secured to any set of electrodes (but preferably between electrodes 12 and 18), extending between the two electrodes, secured as by spot soldering. An ignition fuse wire can extend between electrodes 11 and 12; or an ignition fuse wire can extend between electrode 11 and spherical portion 17 of electrode 16; or a fuse wire can extend between electrode 12 and spherical portion 18 of electrode 16. Once the wire is fused, convective ionized gases will initiate arc paths across all three phases.

Other conventional arc starting methods may be employed, such as "seeding" with ionized gas.

Whereas electrode portions 17 and 18 have been described as spherical, and such a shape is regarded as the best, other shapes forming portions of enlarged diameter may be employed.

Whereas I have shown and described my invention with respect in an embodiment thereof which gives satisfactory results, it should be understood that changes may be made and equivalents substituted without departing from the spirit and scope of the invention.

I claim as my invention:

1. In arc heater apparatus having means forming an arc chamber, means for admitting gas to be heated into the chamber, means for setting up a magnetic field in the chamber, and nozzle means for exhausting heated gas from the chamber, the combination of a first toroidal electrode disposed in the chamber, the first toroidal electrode being electrically insulated from the chamber forming means, a second toroidal electrode disposed in the chamber in substantial axial alignment with the first toroidal electrode and spaced from the first toroidal electrode a predetermined distance, the second toroidal electrode being insulated from the chamber forming means, and a rod electrode having first and second poritons of enlarged diameter, the rod electrode being disposed substantially along the axes of the first and second toroidal electrodes, the first and second portions of enlarged diameter being substantially coplanar with the first and second toroidal electrodes respectively, the first and second toroidal electrodes and the rod electrode being adapted to be connected to the three phases of a three-phase alternating current source of potential to produce three arcs in the arc chamber, one of the arcs taking place between the first portion of enlarged diameter of the rod electrode and the first toroidal electrode, another arc taking place between the second portion of enlarged diameter of the rod electrode and the second toroidal electrode, a third arc taking place between the first toroidal electrode and the second toroidal electrode.

2. Apparatus according to claim 1 including in addition, a heat shield disposed between the first and second toroidal electrodes, the heat shield including a coil of hollow tubing composed of a highly heat conductive material and adapted to have a cooling fluid flow therethrough.

3. In arc heater apparatus, in combination, a first toroidal electrode, a second toroidal electrode spaced from the first toroidal electrode in predetermined position, a third electrode shaped generally in the form of a rod extending through the opening in one of the toroidal electrodes, the third electrode having at least a portion thereof extending at least to the opening in the other toroidal electrode, means forming an arc chamber at least partially enclosing all the electrodes, means for admitting gas to be heated into the chamber, nozzle means for the chamber, and circuit means connected to the first and second toroidal electrodes and to the rod electrode for producing three arc paths inside the arc chamber, two of the paths being between the rod electrode and the first and second toroidal electrodes, and a third arc path being between the first and second toroidal electrodes.

4. Apparatus according to claim 3 including in addition means for setting up a magnetic field in the arc chamber in predetermined position with respect to the arcs.

5. Arc heater apparatus comprising, in combination, means forming an arc chamber, means for admitting gas to be heated into the chamber, a first toroidal electrode disposed in the chamber, a second toroidal electrode disposed in the chamber in substantial coaxial alignment with the first toroidal electrode and spaced therefrom a predetermined distance, a rod electrode in the chamber disposed substantially along the axes of the first and second toroidal electrodes, heat shield means disposed between the first and second toroidal electrodes, first field coil means disposed adjacent the first toroidal electrode and adapted to be energized, second field coil means disposed adjacent the second toroidal electrode and adapted to be energized, nozzle means for the chamber, and means for applying a three-phase alternating current potential to the first and second toroidal electrodes and to the rod electrode for setting up three arc paths in the chamber.

6. Apparatus according to claim 5 wherein the means for admitting gas to be heated into the chamber is additionally characterized as including means for admitting gas to the arc chamber at a plurality of spaced points around the periphery of the heat shield means, and means for admitting gas to the chamber at a plurality of points around the rod electrode, gas admitted to the chamber at the points around the heat shield means passing through two of the arc paths, and gas admitted to the chamber at points around the rod electrode passing through two of the arc paths.

7. In arc heater apparatus, in combination, a first generally ring-shaped toroidal electrode having the thickness of the electrode tapering from a relatively thick portion at the inner surface of the ring to a relatively thin portion at the outer surface of the ring, the electrode having an annular passageway therein near the inner surface of the ring, inlet conduit means communicating with the annular passageway for bringing a cooling fluid thereto, outlet conduit means communicating with the passageway for conducting fluid therefrom, the inlet and outlet conduit means being disposed substantially 180° apart whereby cooling fluid follows two semi-circular paths in the electrode, a second toroidal electrode disposed in spaced position with respect to the first toroidal electrode and in substantial axial alignment therewith, the second toroidal electrode having an inner diameter substantially equal to that of the first toroidal electrode, the second toroidal electrode having a thickness which tapers from a relatively thick portion at the inner surface thereof to a relatively thin portion at the outer surface thereof, the second toroidal electrode having an annular passageway therein near the inner surface thereof, inlet conduit means and outlet conduit means connected with the annular passageway of the second toroidal electrode for bringing a cooling fluid to the electrode passageway and conducting the fluid from the electrode passageway, the inlet and outlet conduit means of the second toroidal electrode being disposed substantially 180° apart whereby cooling fluid follows two semi-circular paths in the second electrode, a rod electrode disposed substantially coaxially with the axes of the first and second toroidal electrodes and having first and second spherical portions thereon substantially coplanar with the first and second toroidal electrodes, the rod electrode having conduits extending the length thereof for bringing cooling fluid into the rod electrode and conducting fluid therefrom, the first and second spherical portions having a plurality of spiral flanges therein to limit the flow of the cooling fluid therethrough to spiral paths adjacent the outer surface of the rod electrode.

8. Arc heater apparatus comprising, in combination, means forming a pressure vessel, nozzle means, means for admitting gas to be heated to the interior of the pressure vessel, a first toroidal electrode disposed in the pressure vessel, the first toroidal electrode having passageways therein for the flow of a cooling fluid, a second toroidal electrode disposed in the pressure vessel in substantial axial alignment with the first toroidal electrode and spaced therefrom a predetermined distance, the second toroidal electrode having passageways therein for the flow of a cooling fluid, heat shield means including a coil of hollow conduit composed of highly heat conductive material adapted to have a cooling fluid flow therein and disposed between the first and second toroidal electrodes, the first and second toroidal electrodes being composed of non-magnetic material, a rod electrode extending substantially along the axes of the toroidal electrodes, a first field coil disposed adjacent the first toroidal electrode near the outer surface thereof, a second field coil disposed adjacent the second toroidal electrode near the outer surface thereof, means for applying energizing potentials to the first and second field coils to set up a magnetic field adjacent all the electrodes and having a predetermined direction and strength, means for applying a three-phase alternating current potential to the first and second toroidal electrodes and to the rod electrode for producing three arcs, and means for admitting gas from the pressure vessel to the chamber formed by the electrodes, the heat shield means and the nozzle means, the nozzle means exhausting heated gases from the chamber.

9. Apparatus according to claim 8 wherein the means for admitting gas from the pressure vessel to the arc chamber is additionally characterized as means for admitting gas at a plurality of spaced points around the peripheries of the first and second toroidal electrodes, and means for admitting gas at a plurality of spaced points around the steam portion of the rod electrode, gas admitted around the peripheries of the toroidal electrodes passing through two arcs before being exhausted by the nozzle means, gas admitted around the steam of the rod electrode passing through the two arcs before being exhausted by the nozzle means.

10. Apparatus according to claim 8 additionally characterized as having the first toroidal electrode adapted to be water cooled, the second toroidal electrode adapted to be water cooled, and said rod electrode adapted to be water cooled.

11. In arc heater apparatus, in combination, a first toroidal electrode adapted to be cooled by a fluid circulating therethrough, a second toroidal electrode disposed in substantial coaxial alignment with the first toroidal electrode and spaced therefrom, the second toroidal electrode being adapted to be cooled by fluid circulating therethrough, heat shield means including a coil of hollow tubing disposed between the first and second toroidal electrodes, the coil being adapted to be cooled by the flow of a fluid therethrough, a rod electrode disposed substantially coaxially with the axes of the first and second toroidal electrodes and having first and second portions of enlarged outer diameter disposed substantially coplanar with the first and second toroidal electrodes respectively, the rod electrode being adapted to be cooled by the flow of a fluid therethrough, first field coil means disposed adjacent the first toroidal electrode on the outside thereof, second field coil means disposed adjacent the second toroidal electrode on the outside thereof, the first and second field coil means being adapted to be energized to set up a magnetic field near all the electrodes, nozzle means disposed adjacent the first field coil means, other heat shield means disposed adjacent the second field coil means and including a coil of hollow tubing composed of highly heat conductive material adapted to be cooled by the flow of a fluid therethrough, means for applying a three-phase alternating current potential to the first and second toroidal electrodes and the rod electrode to produce three arc paths, the first and second toroidal electrodes, the first named heat shield means, the first and second field coil means, the nozzle means, and the other heat shield means adjacent the second field coil means forming an arc chamber, and means for admitting gas to be heated to the arc chamber at points spaced around the periphery of the first named heat shield means and at a plurality of points around the rod electrode, all gas admitted to the arc chamber passing through at least two of the arc paths in the chamber before being exhausted by the nozzle means.

12. Apparatus according to claim 11 including in addition a pressure vessel disposed around the arc chamber forming means.

13. Apparatus according to claim 11 including in addition means forming a pressure vessel enclosing all the electrodes, heat shield means and field coil means, means for admitting gas to be heated into the interior of the pressure vessel, and a plurality of fluid inlet and fluid outlet means passing through the walls of the pressure vessel and insulated therefrom including a first metallic fluid inlet for the first toroidal electrode, said first metallic fluid inlet forming a conductive path for supplying current to the first toroidal electrode, a second metallic fluid inlet forming a conductive path for supplying current to the second toroidal electrode, the stem portion of the rod electrode being insulated from the pressure tank forming means and conducting current to the portions of enlarged diameter thereof.

14. Apparatus according to claim 11 including in addition first and second ring members composed of a highly heat resistant material disposed inside the first and second field coil means respectively.

15. Arc heater apparatus comprising, in combination, means forming a pressure vessel, means for bringing gas to be heated into the interior of the pressure vessel, a plurality of conduit means passing through the walls of the pressure vessel and insulated therefrom, a first toroidal electrode in the pressure vessel electrically connected to one of the conduit means, a second toroidal electrode in the pressure vessel spaced from and in substantial coaxial alignment with the first toroidal electrode and electrically connected to other of the conduit means, annular heat shield means adapted to be cooled by a cooling fluid disposed between the first and second toroidal electrodes, a rod electrode having first and second spherical portions thereon, the rod electrode being disposed substantially coaxially with the axes of the first and second toroidal electrodes, the first and second spherical portions being substantially coplanar with the first and second toroidal electrodes, the rod electrode and the conduit means and other conduit means electrically connected to the first and second toroidal electrodes being adapted to be connected to the three phases of a three-phase alternating current source to create three arc paths, two of the arc paths being between the rod electrode and the first and second toroidal electrodes and the third arc path being between the first and second toroidal electrodes, means for admitting gas to be heated from the interior of the pressure vessel to the area of the arcs, some of the gas being admitted at spaced points around the peripheries of the first and second toroidal electrodes, and some of the gas to be heated being admitted around the stem portion of the rod electrode whereby gas enters the arc area from two directions generally disposed at an angle of 90° with respect to each other to provide good mixing of the gases in the arc area and uniform temperature distribution of the gases, and nozzle means for the pressure vessel for exhausting heated gases from the arc area.

16. Apparatus according to claim 15 including in addition means for setting up a magnetic field in the area of the arc.

17. Apparatus according to claim 15 wherein the first and second toroidal electrodes and the rod electrode are additionally characterized as providing three arc paths of substantially equal length.

18. Apparatus according to claim 15 wherein the heat shield means is additionally characterized as including a fluid cooled coil composed of highly heat conductive material.

No references cited.

JAMES W. LAWRENCE, *Primary Examiner.*

S. A. SCHNEEBERGER, *Assistant Examiner.*